US012693148B2

(12) United States Patent
Moutaux et al.

(10) Patent No.: US 12,693,148 B2
(45) Date of Patent: Jul. 28, 2026

(54) SENSOR FOR DETERMINING A LIQUID LEVEL FOR AN AIRCRAFT TANK, ASSEMBLY OF A TANK AND A SENSOR, METHOD OF USING SUCH A SENSOR

(71) Applicant: SAFRAN HELICOPTER ENGINES, Bordes (FR)

(72) Inventors: Antoine Pascal Moutaux, Moissy-Cramayel (FR); Olivier Robert, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 291 days.

(21) Appl. No.: 18/683,606

(22) PCT Filed: Jul. 27, 2022

(86) PCT No.: PCT/EP2022/071023
§ 371 (c)(1),
(2) Date: Feb. 14, 2024

(87) PCT Pub. No.: WO2023/020797
PCT Pub. Date: Feb. 23, 2023

(65) Prior Publication Data
US 2024/0353250 A1     Oct. 24, 2024

(30) Foreign Application Priority Data
Aug. 17, 2021    (FR) ...................................... 2108730

(51) Int. Cl.
*G01F 23/16*        (2006.01)
*B64D 1/16*        (2006.01)
(Continued)

(52) U.S. Cl.
CPC ............ *G01F 23/162* (2013.01); *G01F 22/02* (2013.01); *G01F 23/185* (2013.01); *B64D 1/16* (2013.01)

(58) Field of Classification Search
CPC ........ G01F 15/10; G01F 15/12; G01F 15/185; G01F 1/48; G01F 1/50; G01F 1/88;
(Continued)

(56) References Cited

U.S. PATENT DOCUMENTS 4,377,809 A * 3/1983 Lawford ................. G01F 23/14
                                                              200/83 L
4,711,127 A * 12/1987 Hafner .................. G01L 9/0089
                                                              73/302
(Continued)

FOREIGN PATENT DOCUMENTS

DE        39 28 679 A1      3/1991
EP        2 700 913 A1      2/2014
FR        3 086 699 A1      4/2020

OTHER PUBLICATIONS

Search Report from the French Intellectual Property Office on corresponding FR application (FR2108730) dated Apr. 29, 2022.
(Continued)

*Primary Examiner* — Tran M. Tran
(74) *Attorney, Agent, or Firm* — Alumen IP Law PC

(57)        ABSTRACT

An assembly of an aircraft tank and a sensor for determining a liquid level in an aircraft tank. The sensor is made up of a closure device, mounted in a port of the tank, and a measuring device, removably mounted on the closure device. The closure device has a liquid line configured to conduct liquid from the port of the tank and a member for automatically sealing the liquid line when the measuring device is not mounted on the closure device and for unsealing the liquid line when the measuring device is mounted on the closure device. The measuring device has at least one
(Continued)

pressure measuring member configured to measure a pressure difference between a liquid pressure in the liquid line and a reference pressure, which can be a gas pressure or the atmospheric pressure, so as to infer therefrom the liquid level in the tank.

18 Claims, 5 Drawing Sheets

(51) Int. Cl.
*G01F 22/02* (2006.01)
*G01F 23/18* (2006.01)

(58) Field of Classification Search
CPC ...... G01F 1/372; G01F 23/248; G01F 23/268; G01F 23/16; G01F 23/18; G01F 23/168; G01F 23/185; G01N 9/26; G01N 9/266; B64D 37/005
See application file for complete search history.

(56) References Cited

U.S. PATENT DOCUMENTS

| | | | | | |
|---|---|---|---|---|---|
| 5,604,315 | A * | 2/1997 | Briefer | ............... | G01N 9/26 73/718 |
| 5,606,513 | A * | 2/1997 | Louwagie | ............... | G01L 9/045 702/138 |
| 5,811,690 | A * | 9/1998 | Hershey | ............... | G01P 1/006 73/299 |
| 5,870,695 | A * | 2/1999 | Brown | ............... | G01F 1/50 702/55 |
| 5,899,962 | A * | 5/1999 | Louwagie | ............... | G01F 15/063 702/138 |
| 6,425,293 | B1 | 7/2002 | Woodroffe | | |
| 6,434,494 | B1 | 8/2002 | Forsythe, Jr. | | |
| 6,571,624 | B1 * | 6/2003 | Grayson | ............... | B64G 1/402 73/290 R |
| 6,578,415 | B2 * | 6/2003 | Schimmel | ............... | G01F 23/247 340/622 |
| 6,837,262 | B2 * | 1/2005 | Cortez | ............... | F16L 37/32 137/15.16 |
| 6,889,547 | B1 * | 5/2005 | Taylor | ............... | G01F 23/18 73/299 |
| 7,017,407 | B1 * | 3/2006 | Hatfield | ............... | G01F 23/02 73/290 R |
| 7,032,449 | B2 * | 4/2006 | Rivas P. | ............... | G01N 9/26 73/299 |
| 7,270,174 | B2 * | 9/2007 | Chu | ............... | H05K 7/2079 73/40 |
| 7,650,759 | B2 * | 1/2010 | Park | ............... | G01F 23/22 73/290 R |
| 7,669,473 | B2 * | 3/2010 | Hedrick | ............... | G01F 23/168 73/299 |
| 7,757,709 | B2 * | 7/2010 | Cortez | ............... | G01F 23/0053 137/393 |
| 8,464,590 | B2 * | 6/2013 | Waldrop | ............... | G01F 23/802 73/1.72 |
| 8,925,382 | B1 * | 1/2015 | Beal | ............... | G01F 23/14 73/299 |
| 8,955,561 | B2 * | 2/2015 | Mitrovich | ............... | G01F 23/14 141/205 |
| 9,121,743 | B2 * | 9/2015 | Sofen | ............... | G01F 23/806 |
| 9,458,006 | B2 * | 10/2016 | Quang | ............... | F15C 1/18 |
| 9,494,457 | B2 * | 11/2016 | Yu | ............... | G01F 23/185 |
| 9,581,483 | B2 * | 2/2017 | Hershey | ............... | G01F 23/185 |
| 10,724,891 | B2 * | 7/2020 | Baxter | ............... | G01F 23/164 |
| 10,830,627 | B2 * | 11/2020 | Gulbrandsen | ............... | B01D 37/045 |
| 10,876,878 | B2 * | 12/2020 | Kulczyk | ............... | G01F 23/14 |
| 10,914,521 | B2 * | 2/2021 | Bernard | ............... | F26B 21/006 |
| 11,448,095 | B2 * | 9/2022 | Cortequisse | ............... | F01D 25/18 |
| 11,976,956 | B2 * | 5/2024 | Hayman | ............... | G01F 23/164 |
| 2014/0007675 | A1 * | 1/2014 | Mehrer | ............... | G01F 23/247 73/295 |
| 2015/0100253 | A1 * | 4/2015 | Austerlitz | ............... | G01F 22/00 702/55 |
| 2017/0089745 | A1 * | 3/2017 | Hershey | ............... | G01F 23/284 |
| 2021/0310848 | A1 * | 10/2021 | Smith | ............... | G01F 23/80 |
| 2021/0356310 | A1 * | 11/2021 | Sosnowski | ............... | B29C 64/393 |
| 2023/0294838 | A1 * | 9/2023 | Gaikwad | ............... | B64D 37/30 702/55 |
| 2024/0167865 | A1 * | 5/2024 | Patrício Domingues Gonçalves | .. | G01F 23/14 |
| 2024/0391606 | A1 * | 11/2024 | Vignola | ............... | B64D 45/00 |
| 2025/0035499 | A1 * | 1/2025 | Pilkington | ............... | G01F 23/18 |

OTHER PUBLICATIONS

International Search Report and Written Opinion on corresponding PCT application (PCT/EP2022/071023) from International Searching Authority (EPO) dated Oct. 3, 2022.

* cited by examiner

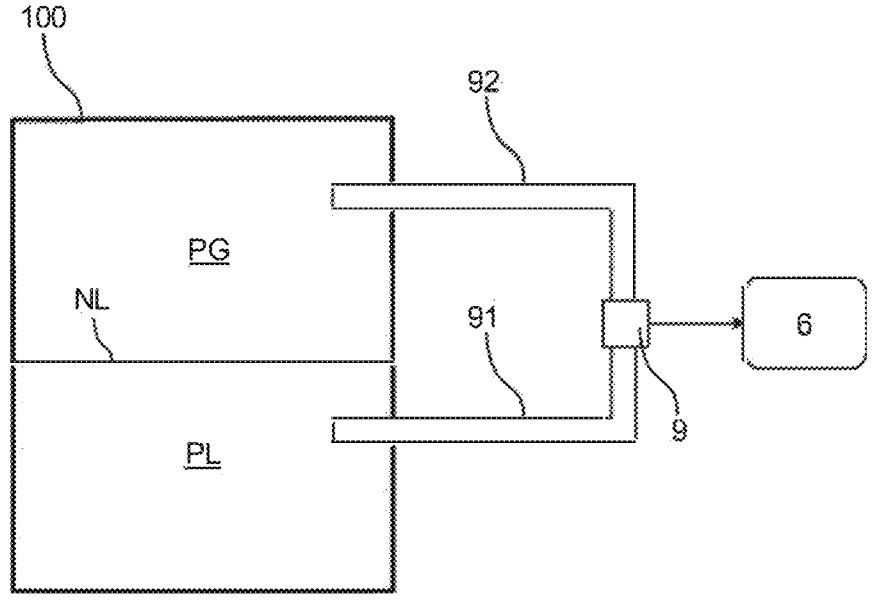
FIG. 1    (Prior Art)
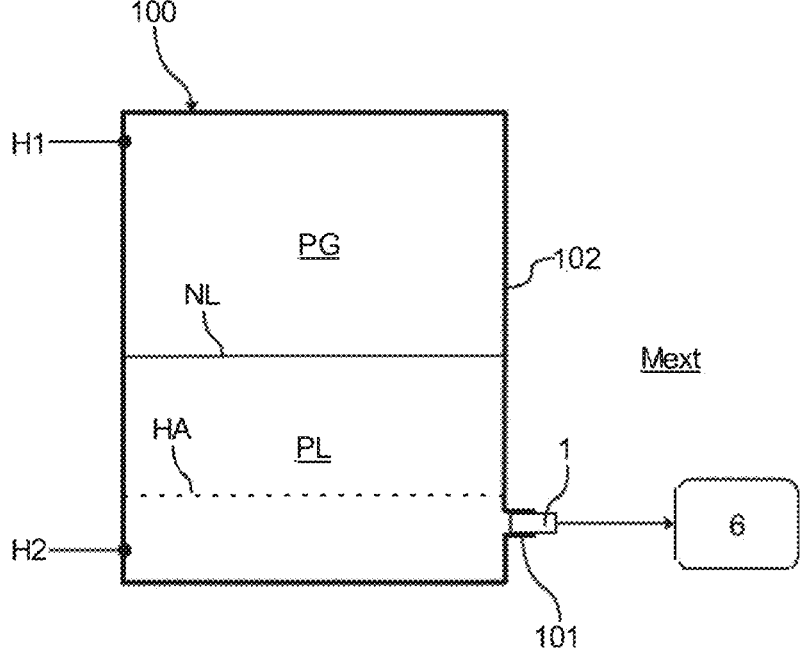
FIG. 2

SENSOR FOR DETERMINING A LIQUID LEVEL FOR AN AIRCRAFT TANK, ASSEMBLY OF A TANK AND A SENSOR, METHOD OF USING SUCH A SENSOR

TECHNICAL FIELD

The present invention relates to the field of measuring a liquid level in a tank of an aircraft, in particular an oil tank of a helicopter.

It is known to use a level sensor immersed in a tank of an aircraft to measure a liquid level, for example by measuring the position of a level sensor float in the tank. An immersed level sensor needs to adapt to the shape of the tank, which is a major drawback given that the tanks are generally of different shapes as a function of the aircraft. In addition, an immersed level sensor has the drawback of being difficult to access, which penalizes maintenance.

In a known manner, a tank comprises a liquid phase, the level of which is variable, and a complementary gas phase. It has been proposed to use a differential type level sensor in order to determine the liquid level in a tank by measuring, on the one hand, the pressure of the liquid phase and, on the other hand, the pressure of the gas phase.

In practice, with reference to FIG. 1. a differential type level sensor 9 comprises a first casing 91 in relation with the liquid phase PL and a second casing 92 in relation with the gas phase PG of a tank 100. The level sensor 9 determines from the pressure difference a liquid level NL which is transmitted to a calculator 6 of the aircraft in order to provide liquid level information to the aircraft propulsion system or to the pilot.

Such casings 91, 92 extend outside the tank 91, 92, which increases the bulk. In addition, it is necessary to provide dedicated openings in the tank 100 in order to allow the passage of the casings 91, 92, which complicates the manufacture of the tank 100. These problems are all the more important as each tank 100 comprises several differential level sensors 9 in order to ensure a consolidation of the level measurement and to limit errors, in particular, related to the movements of the aircraft. During maintenance, it is necessary to remove the casings 91, 92, which is complex and time consuming.

The invention thus aims to eliminate at least some of these drawbacks by proposing a sensor for determining the liquid level that adapts to any tank, the maintenance of which is simplified while having a limited bulk.

SUMMARY

The invention relates to a sensor for determining a liquid level for an aircraft tank, the sensor comprising:

a closure device, configured to be mounted in a port of the tank allowing liquid circulation, and a measuring device, removably mounted on the closure device.

the closure device comprising a liquid line configured to conduct liquid from the port of the tank and a member for automatically sealing the liquid line if the measuring device is not mounted on the closure device, the measuring device comprising at least one pressure measuring member configured to measure a pressure difference between, on the one hand, a liquid pressure in the liquid line and, on the other hand, a reference pressure so as to deduce therefrom the liquid level in the tank.

Thanks to the invention, a two-part sensor is advantageously proposed making it possible to seal the port in a practical manner to avoid any loss of liquid and/or pollution. In addition, a removable mounting allows simple and rapid maintenance of the measuring member. This may thus be inspected and/or replaced without difficulty.

According to one aspect of the invention, the measuring device comprises an external line opening to the outside of the tank to measure the external pressure as reference pressure. Thus, the measuring device allows the external pressure to be used as a reference pressure. This makes it possible to form a sensor with reduced bulk. It is thus not necessary to provide an upper opening in the tank.

According to another aspect of the invention, the measuring device comprises a gas line configured to be in fluidic communication with a gas phase of the tank as reference pressure. Preferably, the gas line is connected to a tank filler cap, which makes it possible to avoid forming a dedicated port in the tank. Preferably, the gas line is flexible so as to allow practical handling of the filler cap with the gas line.

Preferably, the measuring device comprises two pressure measuring members in order to ensure a redundancy and/or a consolidation of the liquid level measurement.

The invention also relates to an assembly of an aircraft tank and a sensor, as presented previously, of which the closure device of the sensor is mounted in the port of the tank. Preferably, the assembly comprises a single sensor.

Preferably, the tank having a minimum liquid height designated as "alert height", the port is positioned at a height lower than said alert height. Thus, the liquid line is always filled with liquid to provide a liquid pressure.

Preferably, the port is a drain port of the tank in which a drain plug is mounted, the sensor is integrated into said drain plug.

A measurement at the level of the drain plug is very advantageous, given that the closure device performs a sealing function without requiring a dedicated machining in the tank. Further, the very low position of the drain plug ensures that the liquid line will always be filled with liquid to provide a liquid pressure. An integration of the sensor into the drain plug allows the invention to be applied to aircraft tanks in circulation (backward compatibility), which is very advantageous.

Preferably, the tank comprising a mouthpiece formed around the port, the mouthpiece comprising at least one opening, in fluidic communication with a gas phase of the tank via a first internal gas line portion, the closure device comprising a second internal gas line portion configured to supply the measuring member with the gas pressure.

Preferably, the first internal gas line portion is formed in a thickness of a tank wall.

An internal gas line makes it possible to significantly reduce the bulk, the closure device making it possible to supply the measuring device with a liquid pressure and a gas pressure. The bulk is reduced, as is the mass. Preferably, the member for automatically sealing the liquid line makes it possible to seal the liquid line and the second internal gas line portion when the measuring device is not mounted on the closure device.

Preferably, the assembly comprises at least one auxiliary pressure sensor configured to measure a liquid pressure at a determined height of the port so as to deduce therefrom a liquid density. By knowing the density, it is possible to deduce therefrom the type of liquid to determine a liquid level correction parameter. As a result, the liquid level supplied to the pilot is very accurate.

The invention further relates to an aircraft comprising a sensor as previously presented and/or an assembly of an aircraft tank and a sensor as previously presented.

The invention also relates to a method of using a sensor mounted in an aircraft tank, the closure device of the sensor being mounted in the tank port, the sealing member sealing the liquid line, the method comprising steps consisting of:

Mounting the measuring device on the closure device in such a way as to place the measuring member in fluidic communication with the liquid pressure, the sealing member being inactivated following the mounting, Measuring a pressure difference between, on the one hand, the liquid pressure in the liquid line and, on the other hand, a reference pressure so as to deduce therefrom the liquid level in the tank.

Preferably, the method comprises a step of emitting an alarm when the liquid pressure is equal to the reference pressure. In this way, under extreme conditions (rapid descent/ascent), the operator is informed that the level measurement is unreliable. He may thus pilot the aircraft taking into account only other relevant measurements.

BRIEF DESCRIPTION OF THE DRAWINGS

The invention will be better understood upon reading the following description, given as an example, and referring to the following figures, given as non-limiting examples, wherein identical references are given to similar objects.

FIG. 1 is a schematic representation of a tank with a differential measuring sensor according to the prior art.

FIG. 2 is a schematic representation of a tank with a sensor according to a first embodiment of the invention.

It should be noted that the figures set out the invention in detail in order to implement the invention, said figures may of course be used to better define the invention where applicable.

DETAILED DESCRIPTION

The invention will be presented for an oil tank of a helicopter, but it goes without saying that the invention applies to other types of tank (fuel, coolant, etc.) and to other types of aircraft (airplane, etc.).

With reference to FIG. 2, a tank 100 of a helicopter is schematically represented. The tank 100 is represented in the form of a block but this is generally complex with a non-flat bottom. The tank 100 comprises a liquid phase PL, the level of which is variable, and a complementary gas phase PG. The interface between the two phases PL, PG corresponds to the liquid level NL to be determined.

In this example, the tank 100 has a wall 102 having a thickness making it possible to withstand pressure, generally metallic. The tank 100 has at least one liquid inlet H1 and one liquid outlet H2 in order to supply a liquid circuit, in particular an oil circuit for cooling components of an aircraft turbomachine.

In this preferred embodiment, the tank 100 comprises a drain port 101 that is positioned at a low point of the tank 100 so as to allow its draining by gravity. Such a drain port 101 is formed during the manufacture of a tank 100 and advantageously does not require any additional machining.

Figure 3:
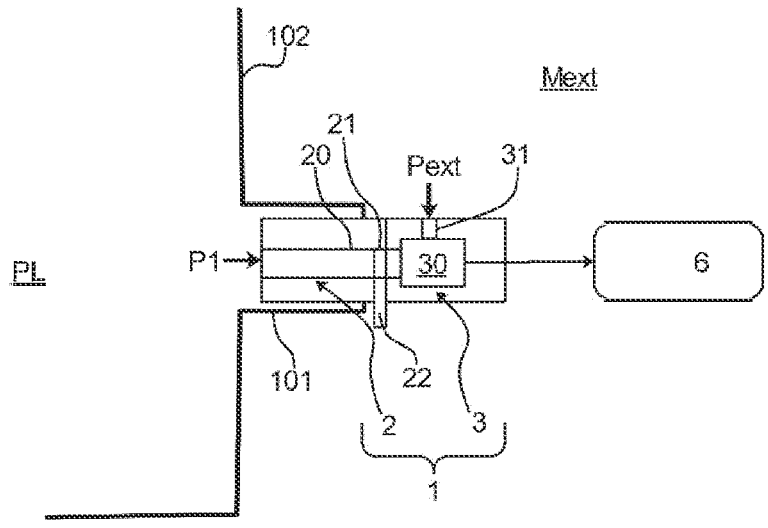
FIG. 3 is a close-up schematic representation of the sensor of FIG. 2.

As illustrated in FIG. 3, the drain port 101 comprises a mouthpiece, preferably cylindrical, to cooperate with a drain plug closing said drain port 101. In this embodiment, a sensor 1 for determining a liquid level NL is integrated into said drain plug so that the latter advantageously fulfills a dual function and limits the bulk.

Nevertheless, it goes without saying that the sensor 1 could be used independently, in particular, in a fluid circulation port other than the drain port 101.

Preferably, the sensor 1 is positioned at a height lower than a minimum liquid height designated as "alert height" HA. Thus, the sensor 1 is always immersed and subjected to the liquid pressure as will be presented hereafter. The drain port 101 has a very low height and complies with this condition. Preferably, the sensor 1 is situated in a position not subject to eddies due to liquid suction and backflow (proximity of the liquid inlet H1 and the liquid outlet H2). The drain port 101 is generally situated in an opposite manner and complies with this condition.

When starting an aircraft turbomachine, a certain amount of oil is taken to fill the pipes of the turbomachine ("gulping" phenomenon). Advantageously, the warning height HA takes this phenomenon into account.

Sensor for Determining a Liquid Level

With reference to FIG. 3, according to a first embodiment, the sensor 1 comprises a closure device 2, configured to be mounted in the drain port 101 and a measuring device 3, removably mounted on the closure device 2. In other words, the measuring device 3 forms a removable accessory that is not necessary to close the tank 100. Due to its removable nature, the maintenance of the measuring device 3 is greatly simplified.

The closure device 2 comprises a liquid line 20 configured to conduct liquid from the drain port 101 and a member 21 for automatically sealing the liquid line 20 if the measuring device 3 is not mounted on the closure device 2. As will be presented hereafter, the cooperation of the measuring device 3 with the closure device 2 makes it possible to deactivate the automatic sealing member 21 and allows a circulation of liquid allowing the liquid pressure P2 to be measured. The automatic sealing member 21 may be in various forms, in particular a non-return valve.

Thus, the closure device 2 advantageously fulfills a stopper function by stopping up the drain port 101. The measuring device 3 makes it possible to measure the fluid level NL and may be replaced rapidly in the event of a malfunction. This solution is advantageous given that it is transposable to any existing tank 100. In addition, in the event of maintenance or technological evolution of the measuring device 3, it may be replaced in a practical manner.

Preferably, the closure device 2 and the measuring device 3 are mounted together mechanically, for example, by screwing, fitting together, by a bayonet system or other. It goes without saying that a magnetic mounting could also be suitable.

According to one aspect of the invention, to enable draining, a tube is inserted from the outside into the automatic sealing member 21 in order to deactivate it and allow the liquid to flow. Alternatively, with reference to FIG. 3, the closure device 2 could comprise a control lever 22 configured to deactivate the automatic sealing member 21 and to allow emptying of the tank 100.

According to the invention, the measuring device 3 comprises at least one pressure measuring member 30 configured to measure a pressure difference between, on the one hand, the liquid pressure P1 in the liquid line 20 and, on the other hand, a reference pressure so as to deduce therefrom the liquid level NL in the tank 100. As will be presented hereafter, the reference pressure may be of different nature.

The measuring device 30 is connected to a calculator 6 of the aircraft in order to provide liquid level information to the aircraft propulsion system or to the pilot.

Preferably, the pressure measuring member 30 is in the form of an electronic chip configured to determine a pressure difference between the liquid pressure P1 and the reference pressure.

In this first embodiment, with reference to FIG. 3, the measuring device 3 comprises a single pressure measuring member 30. The measuring device 3 comprises an external line 31, opening to the outside of the tank 100. In other words, the reference pressure is the external pressure Pext of the external medium Mext, i.e. the atmospheric pressure. The atmospheric pressure Pext forms a stable reference pressure that allows the liquid level NL to be determined accurately in a differential manner.

Thus, the integration of a sensor 1 in a drain plug allows the level of liquid NL to be measured without modifying the tank 100, which is advantageous. The bulk is furthermore limited.

Figure 4:
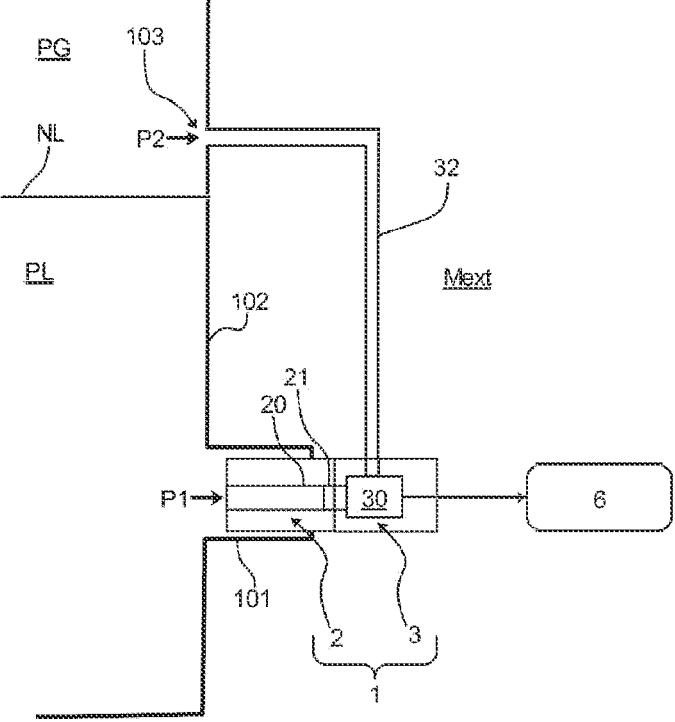
FIG. 4 is a schematic representation of a tank with a sensor according to a second embodiment of the invention.

According to a second embodiment, with reference to FIG. 4, the measuring device 3 comprises a gas line 32 in fluidic communication with the gas phase PG of the tank 100. In other words, the reference pressure Pref is the gas pressure P2, i.e. the pressure of the gas phase PG. With reference to FIG. 4, the gas line 32 extends externally to the tank 100 and connects the measuring member 30 to an upper opening 103 formed in the tank 100. The gas line 32 may be flexible or rigid. Preferably, the gas line 32 is equipped with pneumatic connections at its ends.

According to a preferred aspect, the gas line 32 opens into a filler cap (not shown) mounted in a filler port situated in the upper part of the tank 100. The use of a gas line 32 that is flexible makes it possible to avoid its dismantling when the tank 100 is filled. The filler cap may thus be manipulated while remaining connected to the gas line 32. The gas phase PG makes it possible to form a relevant comparison basis for determining the liquid level NL.

Figure 5:
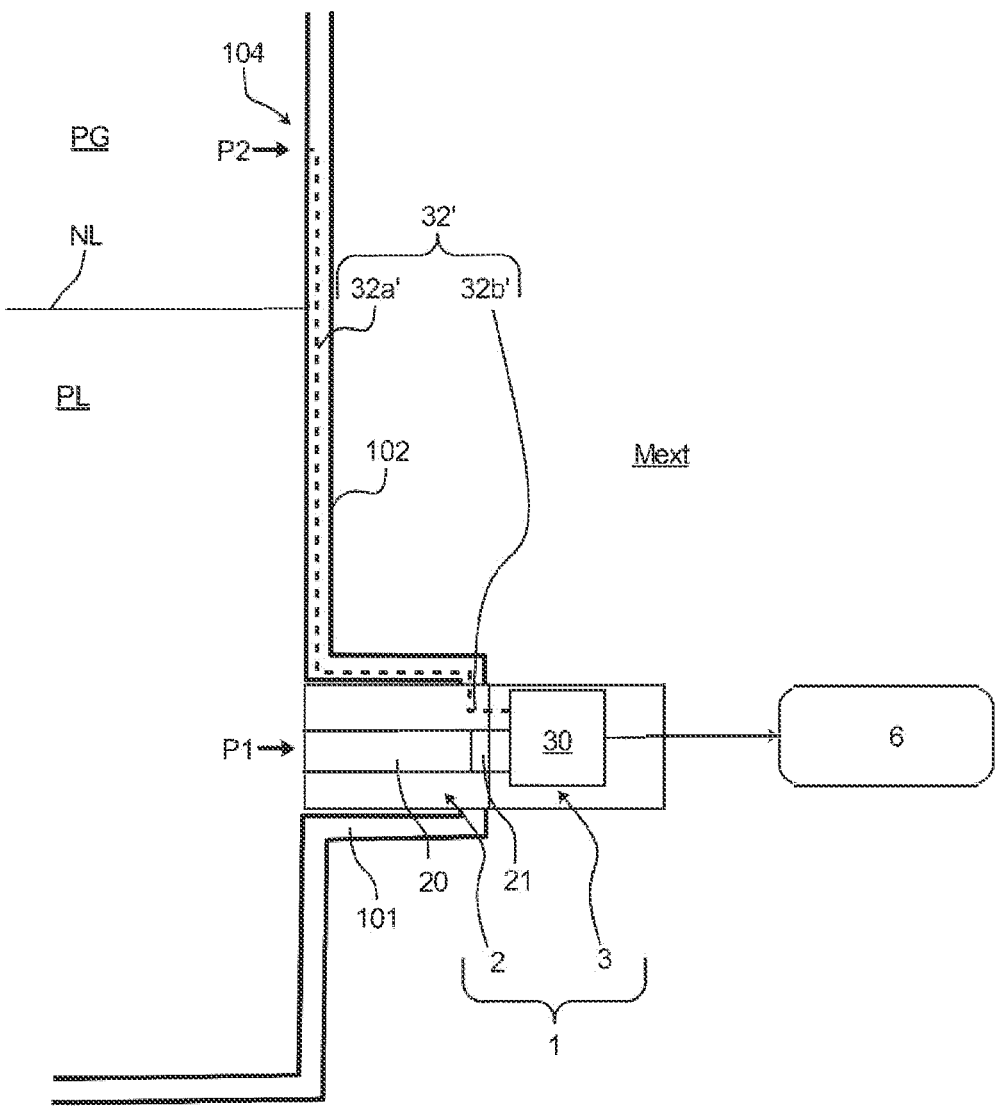
FIG. 5 is a schematic representation of a tank with a sensor according to a third embodiment of the invention.

According to another embodiment, with reference to FIG. 5, the gas line 32' extends internally to the tank 100 and the closure device 2 and makes it possible to connect an upper port 104 (tapping) opening into the interior of the tank 100 and the measuring member 30 of the measuring device 3. The internal gas line 32' comprises a first portion 32a' that is formed in the thickness of the wall 102 of the tank 100 and a second portion 32b' that is formed in the closure device 2. Preferably, the mouthpiece 101 of the tank 100 comprises an opening that allows fluidic communication between the two portions 32a', 32b'. Preferably, seals are provided to ensure leak tightness, in particular O-rings.

In other words, the closure device 2 makes it possible to provide a liquid pressure P1 and a gas pressure P2 in a centralized and practical manner to the measuring device 3. The measuring member 30 thus makes it possible to deduce therefrom the liquid level NL.

Preferably, the first portion 32a' of the gas pipe 32' extends upwards from the upper port 104 and downwards from the opening that allows fluidic communication between the two portions 32a', 32b to avoid any phenomenon of accumulation of liquid mist in the gas pipe 32', which would falsify the measurement.

Figure 6:
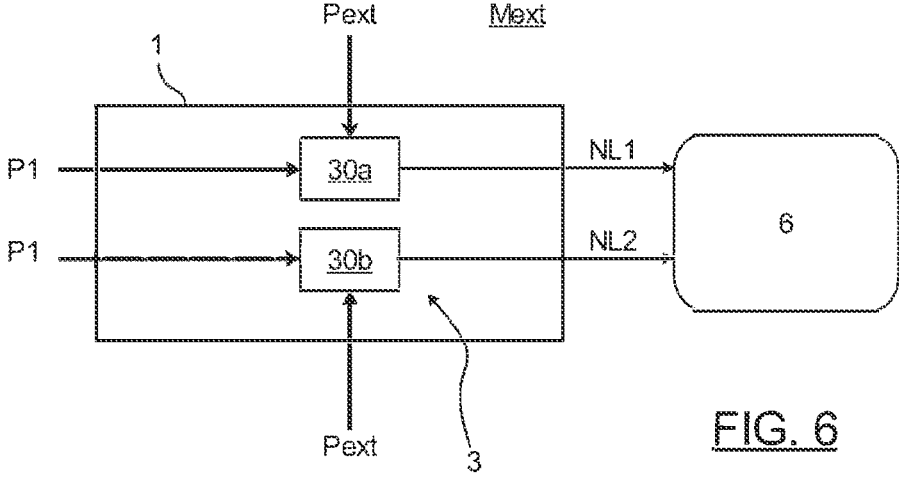
FIG. 6, FIG. 7 and FIG. 8 are schematic representations of the integration of two measuring members in a sensor.
Figure 7:
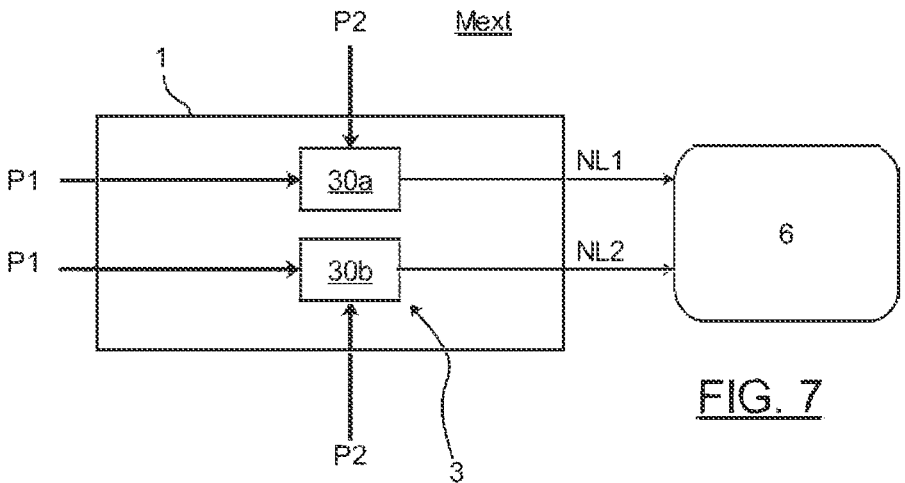
Figure 8:
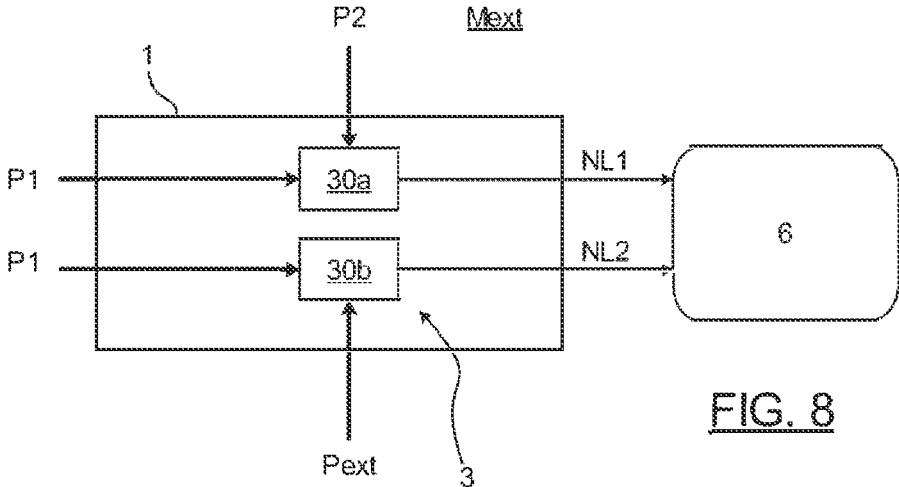

According to a preferred aspect, with reference to FIGS. 6 to 8, the measuring device 3 of the sensor 1 comprises two measuring members 30a, 30b in order to perform independent measurements of level NL1, NL2 that are provided to the calculator 6. This advantageously makes it possible to detect in an early manner any defect of one of the measuring members 30a, 30b. Advantageously, the measuring devices 30a, 30b are integrated into a same sensor 1 to reduce the bulk and the number of machining operations in the tank 100. Preferably, each tank 100 is associated with only one sensor 1, this being able to comprise one or more measuring members 30a. 30b. Due to the redundancy, it is no longer necessary to provide a window in the tank 100 in order to allow a visual check of the liquid level NL.

As illustrated in FIG. 6, the two measuring members 30a, 30b each make it possible to measure a fluid pressure P1 and an external pressure Pext. In this example, the two measuring members 30a, 30b are supplied separately in order to guarantee the independence of the measurements. Nevertheless, it goes without saying that communication with the liquid phase PL or the external medium Mext could be common in order to limit the bulk.

With reference to FIG. 7, the two measuring members 30a, 30b each make it possible to measure a fluid pressure P1 and a gas pressure P2. In this example, the two measuring members 30a, 30b are supplied separately in order to guarantee the independence of the measurements. However, it goes without saying that communication with the liquid phase PL or the gas phase PG could be common in order to limit the bulk.

With reference to FIG. 8, the first measuring member 30a makes it possible to measure a fluid pressure P1 and a gas pressure P2 whereas the second measuring member 30b makes it possible to measure a fluid pressure P1 and an external pressure Pext. The use of two reference pressures of different natures makes it possible to obtain two level measurements NL1, NL2 that are independent and decorrelated. This makes it possible to detect a drift of one of the measuring members 30a, 30b or another fault in a practical manner. Indeed, when the turbomachine is stopped, the pressures P2 and Pext must be identical and lead to the same liquid level measurement NL1, NL2.

The calculator 6 can thus consolidate the level measurements NL1, NL2 (average, etc.) in order to provide qualitative information to the aircraft propulsion system or to the pilot.

Optionally, the density of the liquid (here the oil density) is also determined. Such information is important given that a same turbomachine may be used with oils of different natures. By knowing the oil type, it is possible to determine a correction parameter ANL1 of the level measurement NL and thus improve the measuring accuracy.

Figure 9:
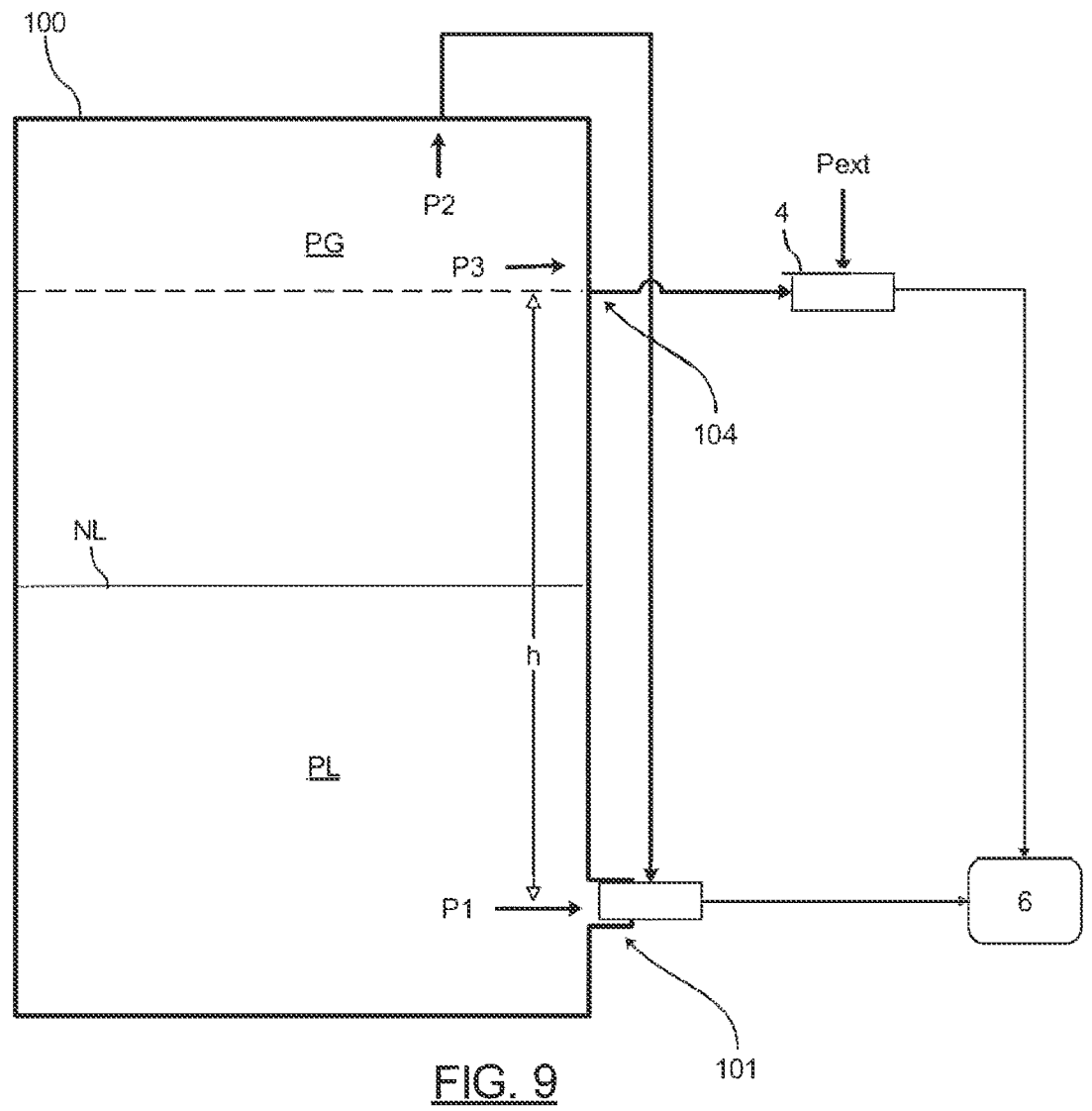
FIG. 9 is a schematic representation of the use of an auxiliary sensor to determine the liquid density.

With reference to FIG. 9, an auxiliary pressure sensor 4 is placed in fluidic communication with the liquid phase via an upper opening 104 of the tank 100 and with the external medium Mext having an external pressure Pext in order to perform a differential pressure measurement that is provided to the calculator 6. Given that the vertical distance h between the upper opening 104 and the port 101 is known, the density of the liquid ρ may advantageously be deduced therefrom by the following formula:

$$\rho = \frac{P_3 - P_2}{gh * \cos(\alpha)} \qquad \text{[Math. 1]}$$

With g being gravity and & the angle formed between the vertical of the aircraft and the gravitational axis.

Preferably, the density measurement p is performed after filling the tank 100. The density measurement p is stored in the calculator 6 and will be used to determine the correction parameter ANL1 of the level measurement NL. It goes without saying that the density measurement p could be determined more frequently.

It is also possible to correct the fill level NL as a function of the temperature. For this purpose, an independent measurement of the liquid temperature is made and supplied to the calculator 6 and will be used to determine a correction parameter ANL2 of the level measurement NL.

Thus, a corrected level measurement NL* is obtained according to the following formula:

$$NL\ast = NL + \Delta NL1 + \Delta NL2 \qquad \text{[Math. 2]}$$

Optionally, the measuring device 3 comprises an amplifier member, in particular hydraulic, in order to increase its sensitivity to the liquid pressure P1 and accurately measure any variation. By way of example, the amplification member is in the form of a piston rod, the ends of which have different sections so as to amplify the variations.

Optionally, the closure device 2 comprises a strainer in order to filter impurities in the liquid, in particular in the automatic sealing member 21.

Method of Use

The invention also relates to a method of using a sensor 1 mounted in a drain port 101 of an aircraft tank 100. The method of use will be presented in relation to the embodiment of FIG. 5 and applies analogously to the other embodiments.

In this exemplary embodiment, in the initial position, only the closure device 2 is mounted in the drain port 101. The sealing member 21 is active and prevents any flow of liquid. If emptying is desired, an operator can introduce a tube into the sealing member 21 or act on the control lever 22.

To perform a measurement of liquid level NL, the operator mounts the measuring device 3 on the closure device 2, which places the measuring member 30 in fluidic communication with the liquid line 20 which has a liquid pressure P1. As illustrated in FIG. 5, the pressure measuring member 30 is also in fluidic communication with the gas phase PG which has a gas pressure P2. Advantageously, the closure device 2 directly enables this fluidic communication.

The method comprises a step of determining the liquid level NL from the liquid pressure P1 and the gas pressure P2 measured by the measuring member 30. Such a differential measurement is robust.

Thanks to the integration of the sensor 1 in a drain plug, the liquid level measurement may be implemented in a practical manner on any type of tank 100. The two-part structure of the sensor 1 makes it possible to ensure draining when required while facilitating maintenance given that the measuring device 3 can be removed in a removable manner.

The invention also relates to a method for detecting operating conditions from the sensor 1 according to the invention, in particular extreme conditions such as a rapid ascent/descent of the aircraft (abrupt change in altitude).

Indeed, during a rapid ascent/descent of the aircraft, the liquid housed in the tank 100 is subjected to weightlessness forces, which modify the pressures measured by the sensor 1.

According to an exemplary embodiment, when the pressure difference is zero, the method comprises a step of emission of an alarm that is provided with the measurement of the liquid level NL or replaces it in order to inform the propulsion system or the pilot of the aircraft that the measurement of the liquid level NL is unreliable given the exceptional conditions. Thus, the differential measurement is taken advantage of to check the operating conditions and to deduce therefrom a relevance rating of the measurement of the liquid level NL that is provided.

The invention claimed is:

1. An assembly of an aircraft tank and a sensor for determining a liquid level for the aircraft tank, the sensor comprising:
   a closure device mounted in a port of the aircraft tank and a measuring device removably mounted on the closure device,
   the closure device comprising a liquid line configured to conduct liquid from the port of the aircraft tank and a sealing member having a body arranged with the liquid line for automatically sealing the liquid line when the measuring device is not mounted on the closure device,
   the measuring device comprising at least one pressure measuring member configured to measure a pressure difference between a liquid pressure in the liquid line and a reference pressure so as to deduce from the liquid pressure and the reference pressure a liquid level in the aircraft tank,
   the aircraft tank comprising a body with a wall having a thickness and a mouthpiece having an elongated body formed around the port, the mouthpiece being in fluidic communication with a gas phase inside the aircraft tank via a first internal gas line portion that is formed in the wall of the tank, and
   the closure device comprising a second internal gas line portion in fluid communication with the first internal gas line to supply the at least one pressure measuring member with a gas pressure for the reference pressure.

2. The assembly according to claim 1, wherein the measuring device comprises an external line having an opening to an outside of the aircraft tank to measure external pressure for use as the reference pressure for deducing the liquid level.

3. The assembly according to claim 1, wherein the measuring device comprises two pressure measuring members, which include the at least one pressure measuring member configured to measure the pressure difference between the liquid pressure in the liquid line and the reference pressure and a separate second pressure measuring member to separately deduce the liquid level in the aircraft tank.

4. The assembly according to claim 1, wherein the aircraft tank has a minimum liquid height defining an alert height the port is positioned at a height lower than said alert height.

5. The assembly according to claim 1, wherein the port is a drain port for the aircraft tank in which a drain plug is mounted, and wherein the sensor is integrated into said drain plug.

6. The assembly according to claim 1, further comprising at least one auxiliary pressure sensor, in addition to the measuring device, configured to measure the liquid pressure at a determined height of the port so as to deduce therefrom a liquid density.

7. The assembly according to claim 6, wherein the at least one auxiliary pressure sensor is connected to an opening of the tank that is spaced from the port.

8. A method of using an assembly of an aircraft tank and a sensor according to claim 1 in which the closure device of the sensor is mounted in the port of the aircraft tank and the sealing member seals the liquid line, the method comprising steps consisting of:

mounting the measuring device on the closure device so as to place the measuring member in fluidic communication with the liquid pressure, the sealing member being inactivated following the mounting, measuring a pressure difference between the liquid pressure in the liquid line and the reference pressure so as to deduce therefrom the liquid level in the tank.

9. The method of use according to claim 8, further comprising a step of emitting an alarm when the liquid pressure is equal to the reference pressure.

10. The assembly according to claim 1, wherein the liquid line is unsealed when the measuring device is mounted on the closure device.

11. The assembly according to claim 1, wherein the reference pressure for deducing the liquid level is atmospheric pressure.

12. The assembly according to claim 1, wherein the sealing member is a non-return valve.

13. The assembly according to claim 1, further comprising a gas line external to the aircraft tank, the gas line connects the at least one pressure measuring member and an opening formed through the aircraft tank, which is spaced from the port.

14. The assembly according to claim 13, wherein the gas line is embodied as a flexible line or a rigid line.

15. The assembly according to claim 14, wherein a filler cap is located at the opening, and wherein the gas line is connected to the filler cap.

16. The assembly according to claim 1, wherein the reference pressure is the gas pressure of a gas phase inside the aircraft tank.

17. The assembly according to claim 1, further comprising a control lever located in the closure device, the control lever having a structure configured to deactivate the automatic sealing member.

18. An aircraft comprising an assembly of an aircraft tank and a sensor for determining a liquid level for the aircraft tank, the sensor comprising:

a closure device mounted in a port of the aircraft tank and a measuring device removably mounted on the closure device, the closure device comprising a liquid line configured to conduct liquid from the port of the aircraft tank and a sealing member having a body arranged with the liquid line for automatically sealing the liquid line when the measuring device is not mounted on the closure device, the measuring device comprising at least one pressure measuring member configured to measure a pressure difference between a liquid pressure in the liquid line and a reference pressure so as to deduce from the liquid pressure and the reference pressure a liquid level in the aircraft tank, the aircraft tank comprising a body with a wall having a thickness and a mouthpiece having an elongated body formed around the port, the mouthpiece being in fluidic communication with a gas phase inside the aircraft tank via a first internal gas line portion that is formed in the wall of the tank, and the closure device comprising a second internal gas line portion in fluid communication with the first internal gas line to supply the at least one pressure measuring member with a gas pressure for the reference pressure.

* * * * *